(12) United States Patent
Jeong

(10) Patent No.: US 7,942,183 B2
(45) Date of Patent: May 17, 2011

(54) METHOD OF PARTIAL PAINTING USING HOLOGRAM TRANSFER FILM AND MANUFACTURING METHOD OF PAINTING COMPOSITION AND DEVICE FOR PREPARING HOLOGRAM PARTICLE

(76) Inventor: Yeon-Kil Jeong, Daejeon (KR)

( * ) Notice: Subject to any disclaimer, the term of this patent is extended or adjusted under 35 U.S.C. 154(b) by 677 days.

(21) Appl. No.: 11/914,644

(22) PCT Filed: May 15, 2006

(86) PCT No.: PCT/KR2006/001813
§ 371 (c)(1),
(2), (4) Date: Nov. 16, 2007

(87) PCT Pub. No.: WO2006/123880
PCT Pub. Date: Nov. 23, 2006

(65) Prior Publication Data
US 2008/0190551 A1 Aug. 14, 2008

(30) Foreign Application Priority Data

May 16, 2005 (KR) .................. 10-2005-0040918
Feb. 27, 2006 (KR) .................. 10-2006-0018769

(51) Int. Cl.
*B32B 38/10* (2006.01)
*C23C 14/02* (2006.01)

(52) U.S. Cl. ........ 156/584; 156/247; 156/230; 156/239; 156/256; 156/277; 156/267; 156/289; 156/145; 156/280; 156/344

(58) Field of Classification Search .................. 156/256, 156/230, 239, 247, 267, 277, 289, 71, 145, 156/280, 344, 584; 264/37.3, 37.31, 37.32, 264/37.33
See application file for complete search history.

(56) References Cited

U.S. PATENT DOCUMENTS 5,500,310 A * 3/1996 King et al. .................. 430/1
(Continued)

FOREIGN PATENT DOCUMENTS

EP 1449630 A1 * 8/2004
JP 06-219096 8/1994
(Continued)

*Primary Examiner* — Kat Wyrozebski
*Assistant Examiner* — Keith T Aziz
(74) *Attorney, Agent, or Firm* — Weiner & Burt, P.C.; Irving M. Weiner; Pamela S. Burt

(57) ABSTRACT

The present invention relates to a partial painting method, and more particularly, to a painting method wherein a printing layer is completely transferred onto a base material surface by attaching a hologram transfer film on the base material surface subjected to transparent painting, heat-treating it to transfer a printing portion and then removing a base material film. Since the printing layer is completely transferred onto and impregnated into the transferred surface of the present invention, there occurs no step and the printing layer is not erased due to a solvent. Further, the present invention relates a method of preparing a painting composition using a hologram transfer film and a painting method using the painting composition. More particularly, there is provided a method of preparing a painting composition, wherein a remaining portion except a base material film of a transfer film having a hologram thin film formed thereon is scratched to use by mixing with a binder solution so that a hologram pattern provided with a three-dimensional effect can be coated through a relatively simple method, and a painting method using the painting composition, a painting composition and a device for preparing hologram particles used in preparing the painting composition.

8 Claims, 7 Drawing Sheets

U.S. PATENT DOCUMENTS

| | | | |
|---|---|---|---|
| 6,051,168 A * | 4/2000 | Yamamoto et al. | 264/37.3 |
| 6,264,782 B1 | 7/2001 | Oshima | |
| 6,296,035 B1 * | 10/2001 | Yamamoto et al. | 156/584 |
| 6,413,687 B1 | 7/2002 | Hattori | |
| 2003/0070754 A1 * | 4/2003 | Francis et al. | 156/344 |

FOREIGN PATENT DOCUMENTS

| | | |
|---|---|---|
| JP | 09-2730091 | 10/1997 |
| JP | 2005-298905 | 10/2005 |
| KR | 2003-15743 | 2/2003 |
| KR | 20-0371819 | 12/2004 |

* cited by examiner

[Fig. 1]
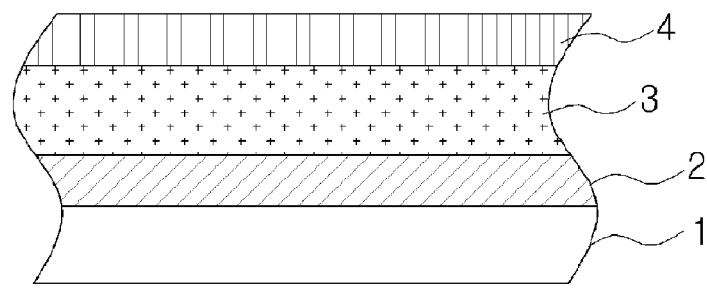
[Fig. 2]
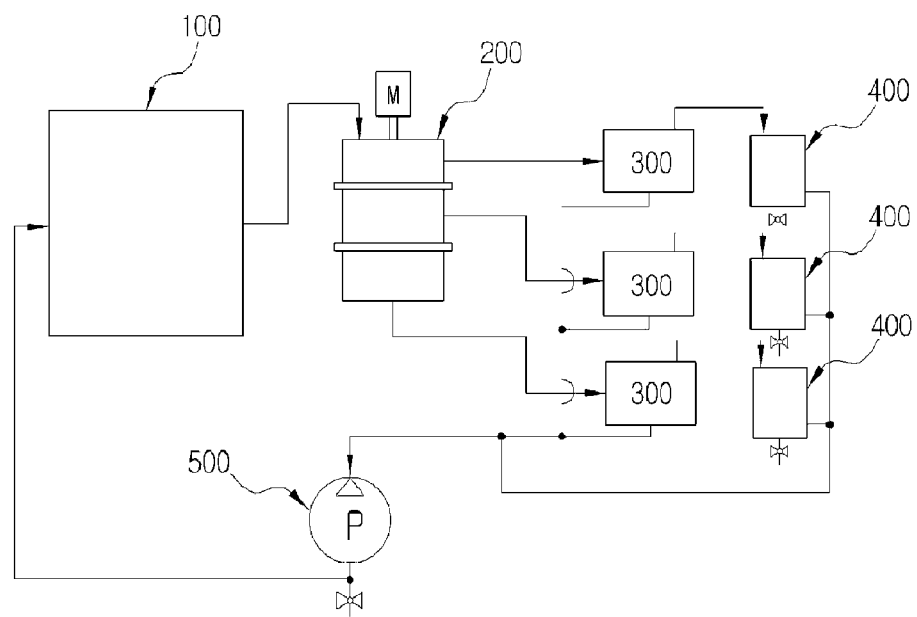
[Fig. 3]
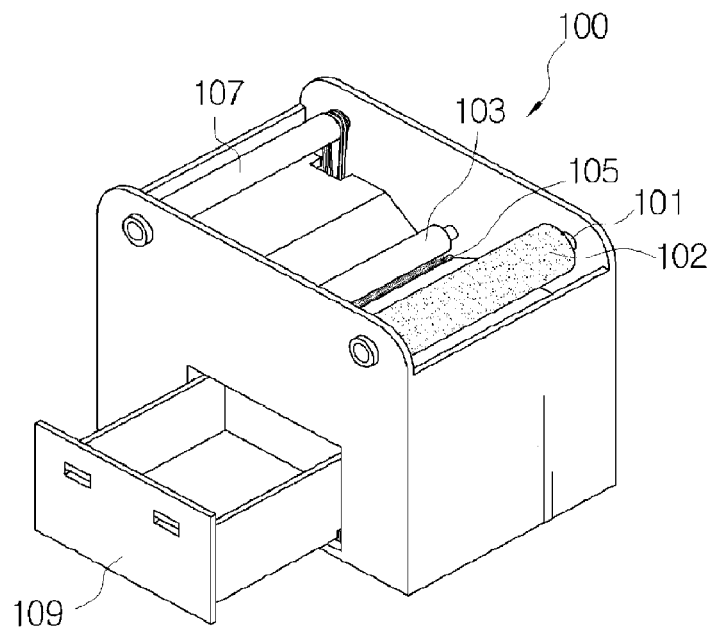

[Fig. 4]
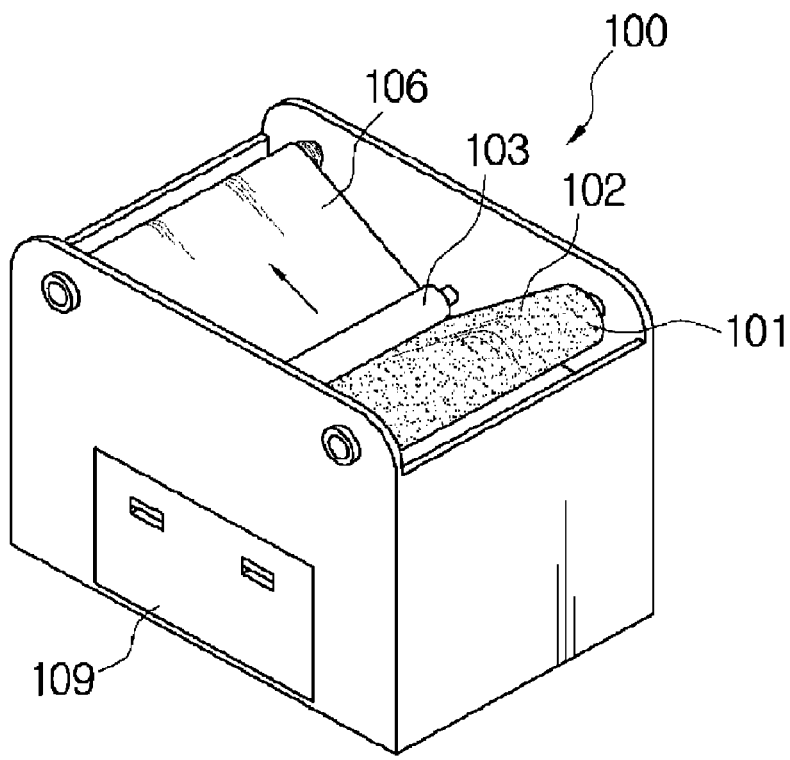
[Fig. 5]
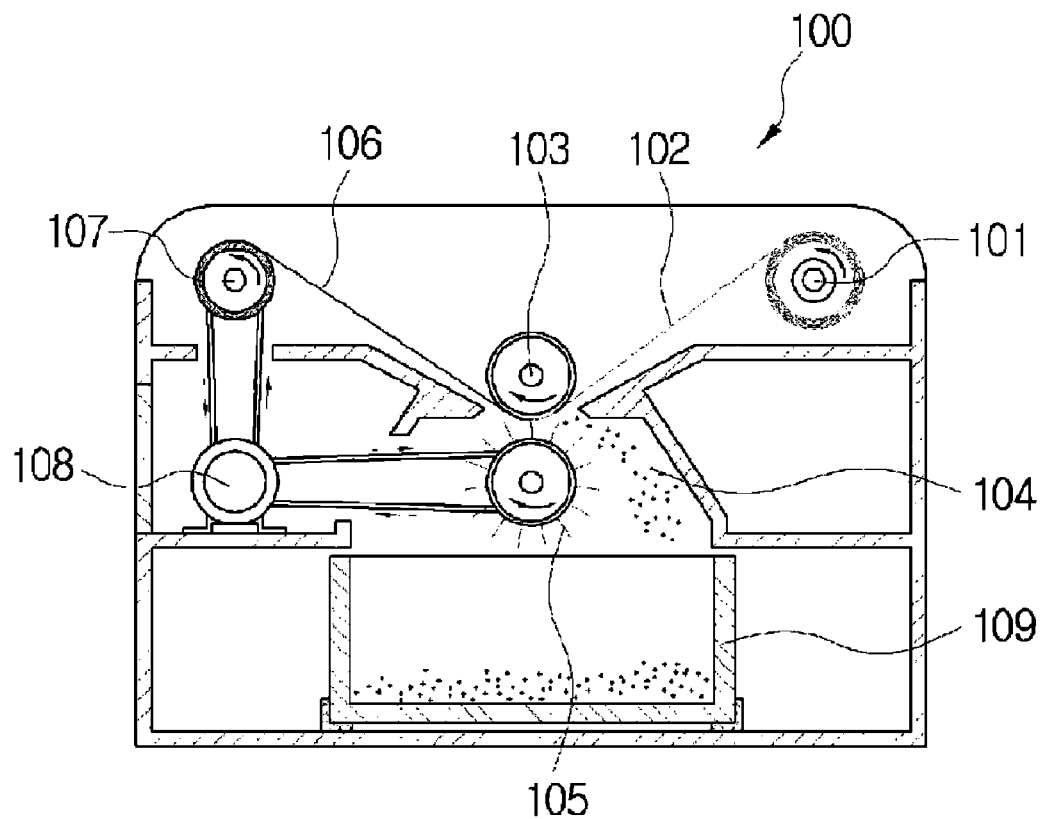

[Fig. 6]
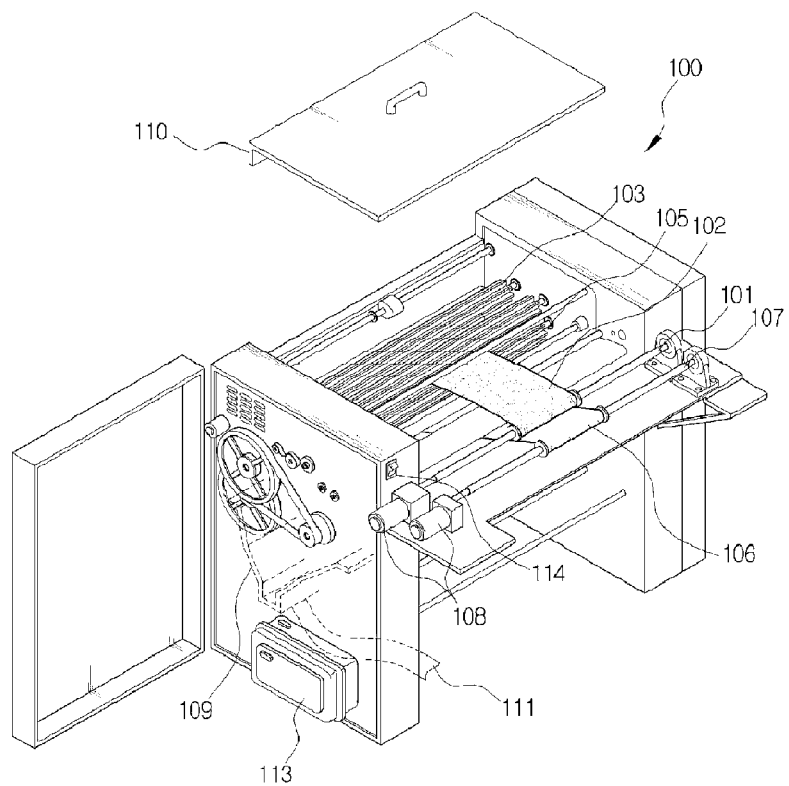
[Fig. 7]
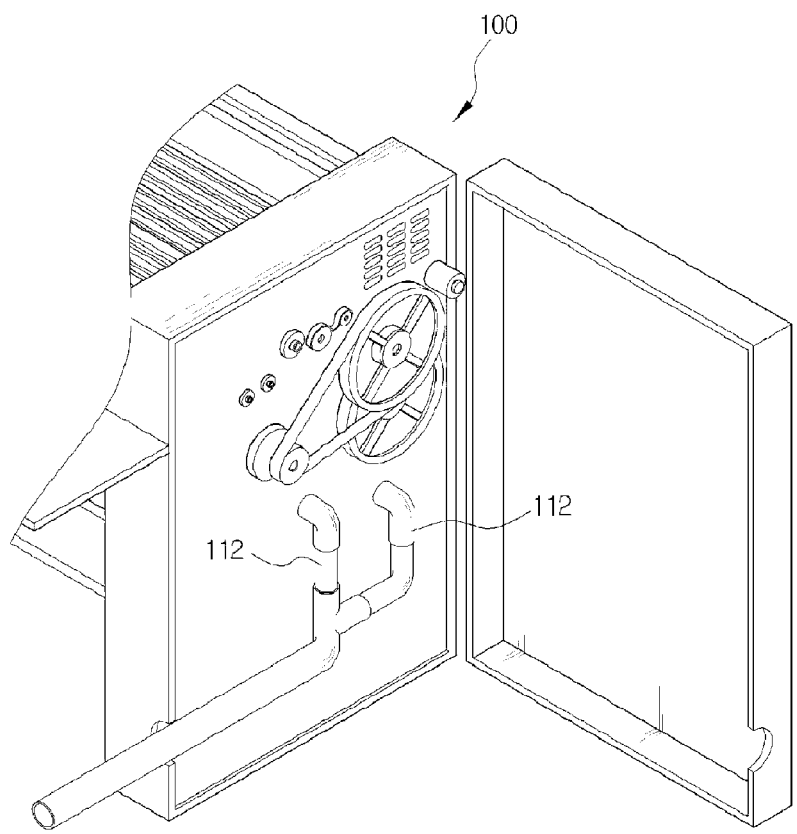

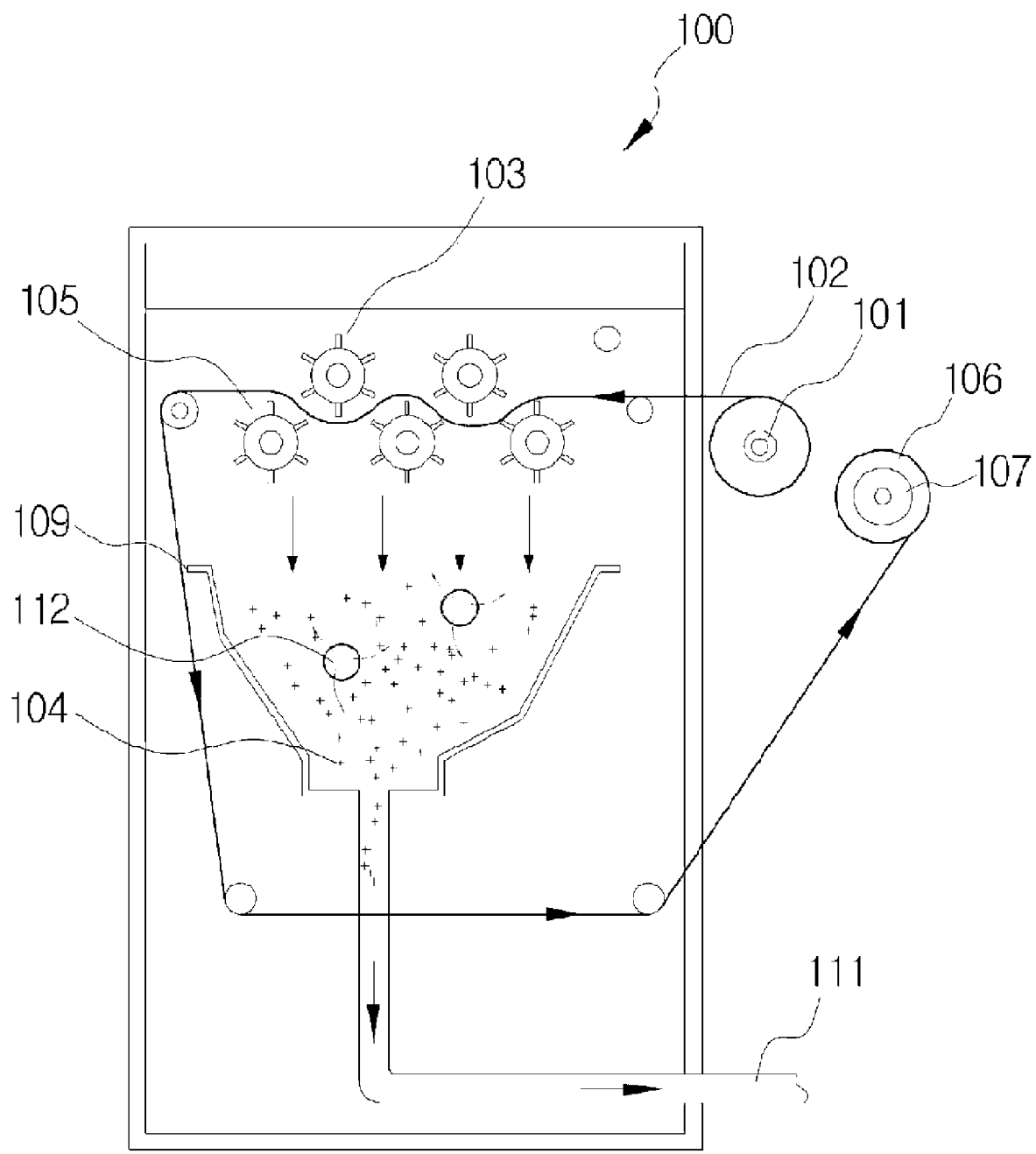
[Fig. 8]

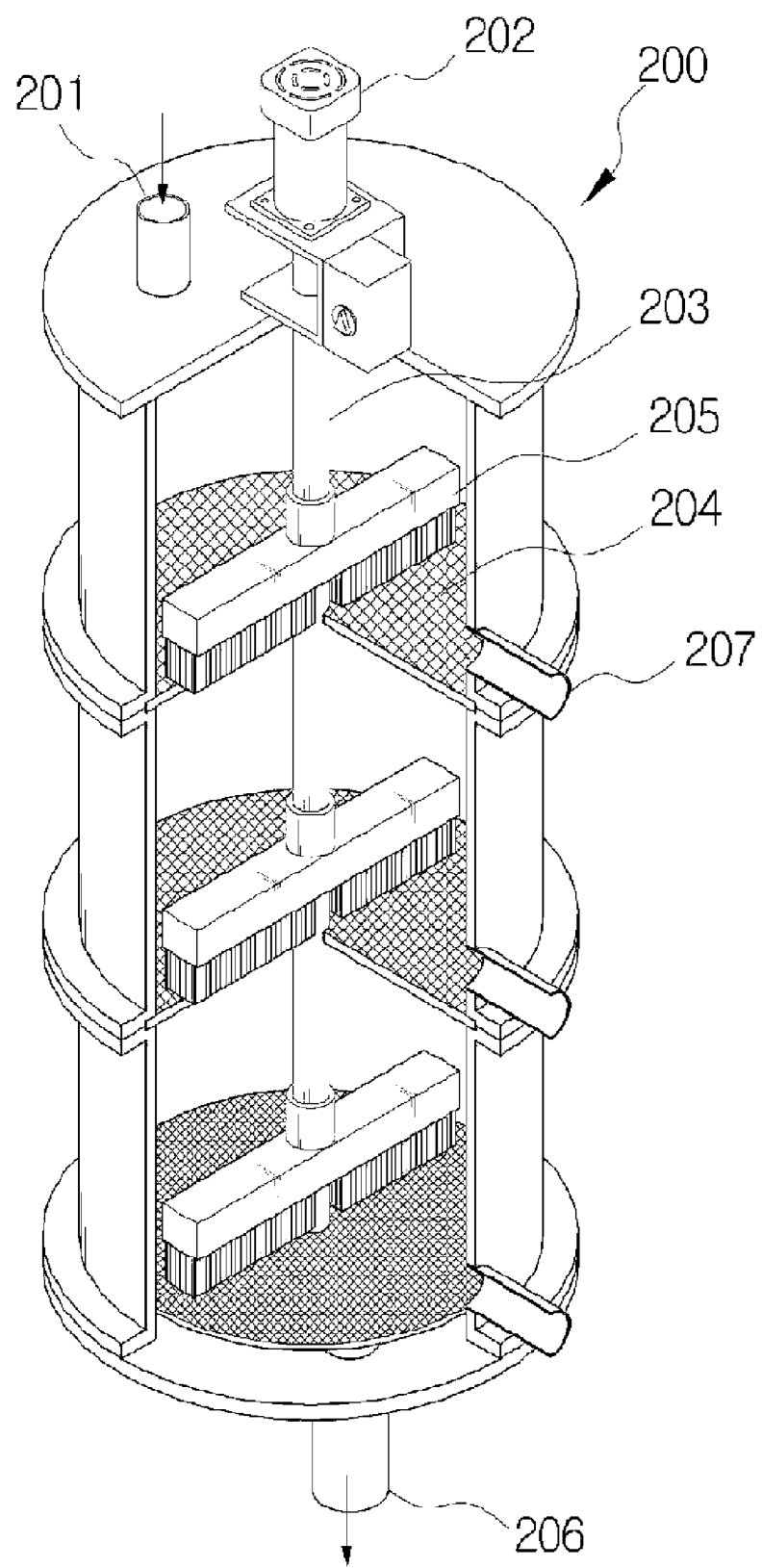
[Fig. 9]

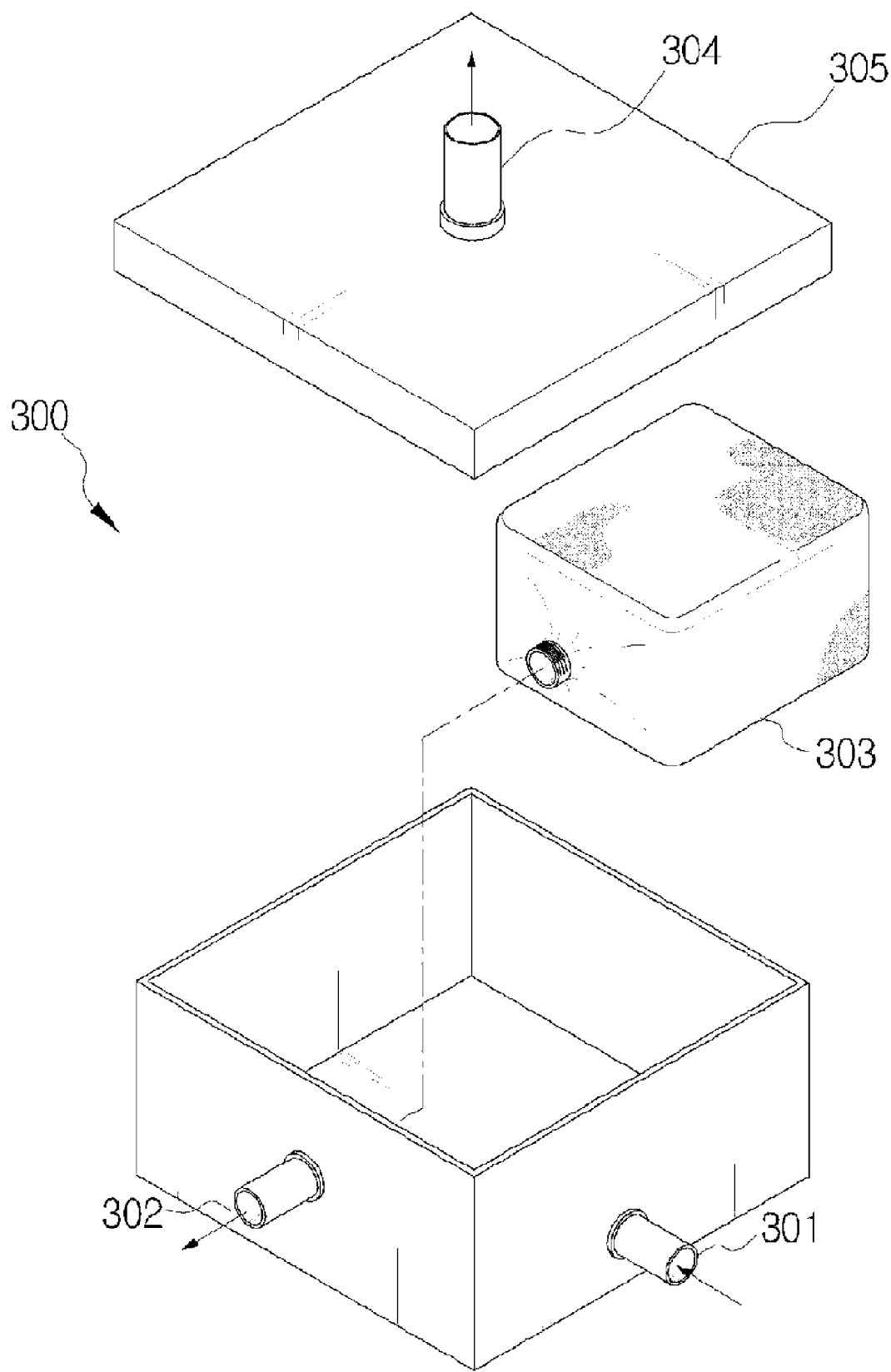
[Fig. 10]

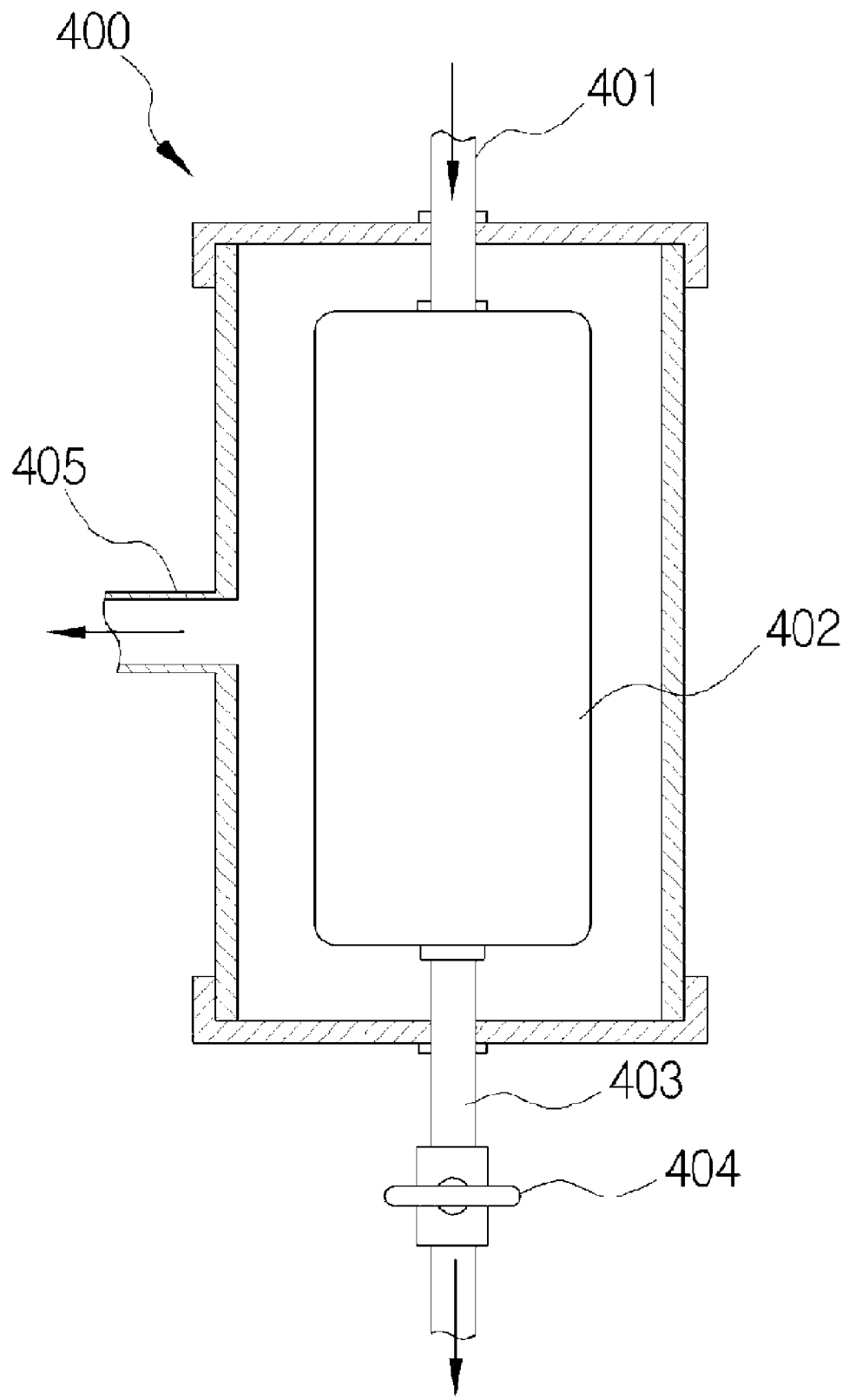
[Fig. 11]

US 7,942,183 B2

METHOD OF PARTIAL PAINTING USING HOLOGRAM TRANSFER FILM AND MANUFACTURING METHOD OF PAINTING COMPOSITION AND DEVICE FOR PREPARING HOLOGRAM PARTICLE

TECHNICAL FIELD

The present invention relates to a method of partial painting using a hologram transfer film, a manufacturing method of a composition used for painting using the same and a device for preparing hologram particles used in the painting composition.

More particularly, the present invention relates to a partial painting method wherein a printing pattern is completely transferred onto and impregnated into transparent painting by attaching a hologram transfer film on a base material surface subjected to transparent painting, heat-treating it to transfer a printing portion and then removing a base material film, so that there occurs no step, it is possible to easily attach even on an irregular surface and the printing pattern is not erased due to the complete attachment although a solvent is used.

Further, the present invention relates to a painting composition wherein the remaining portions except a base material film in a transfer film composed of the base material film, a protection film, a hologram thin film layer and a heat adhesive layer are scratched to collect and then mixed with a binder solution, a method of preparing the painting composition and a device used therefor.

BACKGROUND ART

Hologram films or stickers have been used as high-quality decorations due to their glosses, and their durability is secured even in use for a long period of time so that their demand tends to increase rapidly.

Painting for automobiles comprises three steps of base painting, pigment painting and clear painting. The clear painting thereamong is to paint for the purpose of giving a gloss on a body surface of an automobile in view of fine appearance and also functions to protect an automobile body from dust or dirt.

Although to beautifully decorate the appearance of an automobile, transfer films or stickers have been recently attached thereon, in a case where a conventional transfer film is used, there is a disadvantage in that its durability of peeling off or the like is degraded due to its viscosity at a normal temperature if a physical force is applied or a solvent is used. Besides, in a case where a general sticker is attached, there is a disadvantage in that its durability is degraded because a foreign substance is produced due to the generation of a step or it is easily released, and it is impossible to paint a certain shape or character which is various and standardized.

Further, it is difficult to form a hologram pattern on a base material surface of an automobile or the like; in a case where metallic powder that comes into the market is used, its surface is rough and becomes metallic due to an opaque feeling of the metallic powder; and an elegant effect in that a different color is expressed depending on an angle of light cannot be imparted.

DISCLOSURE OF INVENTION

Technical Problem

An object of the present invention is to provide a novel painting method of forming a coating film on a base material surface of an automobile or the like using a hologram transfer film, wherein there occurs no step and the hologram transfer film is completely impregnated into the base material surface through a method of performing transparent painting on the base material surface and then attaching and heat-treating the hologram transfer film.

An another object of the present invention is to provide a painting composition wherein a portion having a hologram pattern except a base material film of a hologram transfer film formed thereon is scratched and mixed with a binder solution to use by means of a device for preparing hologram particles according to the present invention so that there is a characteristic in that the tabular shape of the hologram particles is maintained and a hologram can be painted through a simple method, and a painting method using the painting composition.

A further object of the present invention is to provide a method of preparing a painting composition with which a different color can be shown depending on a viewing angle in facing light although a hologram does not appear at a place with no light, and a hologram pattern with thin and various sizes and shapes can be easily painted depending on a coating method and the number of times, and a painting method using the painting composition.

A still further object the present invention is to provide a painting composition and a painting method, wherein a hologram pattern can be formed through a simple method and a high-quality painting is possible.

A yet further object the present invention is to provide a device for preparing hologram particles, for consecutively scratching hologram particles from a hologram transfer film.

Technical Solution

The present invention relates to a painting method using a hologram, and more particularly, to a partial painting method wherein a printing pattern is completely transferred onto and impregnated into transparent painting by attaching a hologram transfer film on a base material surface subjected to transparent painting, heat-treating it to transfer a printing portion and then removing a base material film; a method of preparing a painting composition wherein a remaining portion except a base material film of a transfer film is scratched to obtain hologram particles and then mixed with a binder solution; and a device used for scratching.

In the partial painting method according to the present invention, since the printing layer is completely transferred onto and impregnated into the transparent painting of the present invention, there occurs no step and the printing layer is not erased due to a solvent. In the present invention, the base material surface is any one of a metallic surface, a wooden surface and a plastic surface, and the metallic surface is any one of an automobile trim, a refrigerator, a washing machine, a microwave oven, an air conditioner, iron furniture, an aluminum product and an elevator. However, the base material surface and the metallic surface are not limited thereto.

Further, in a method for preparing a painting composition using a hologram transfer film according to the present invention, a hologram transfer film is consecutively scratched using a device for preparing hologram particles to prepare hologram particles, and then mixed with a binder solution, so that a painting composition can be prepared through a relatively simple method and a hologram pattern can be formed depending on the number of painting when painting on a base material surface. Further, a hologram effect in that a different color is shown depending on an angle if the base material surface receives light can be imparted to the base material surface painted in such a manner.

BRIEF DESCRIPTION OF THE DRAWINGS

The above and other objects, features and advantages of the present invention will become apparent from the following description of preferred embodiments given in conjunction with the accompanying drawings, in which:

FIG. 1 is sectional view showing an example of a transfer film used in partial painting of the present invention;

FIG. 2 shows a schematic view of a device for preparing hologram particles of the present invention;

FIG. 3 is a perspective view showing an exemplary embodiment of a main body used in the device for preparing hologram particles of the present invention;

FIG. 4 is a perspective view showing an operation of the main body used in the device for preparing hologram particles of the present invention;

FIG. 5 is a sectional view of the main body used in the device for preparing hologram particles of the present invention;

FIG. 6 is a perspective view showing another exemplary embodiment of the main body used in the device for preparing hologram particles of the present invention;

FIG. 7 is a perspective view showing an opposite side of the main body used in the device for preparing hologram particles of the present invention;

FIG. 8 shows a sectional view of the main body used in the device for preparing hologram particles of the present invention;

FIG. 9 is a sectional perspective view showing a classifier used in the device for preparing hologram particles of the present invention;

FIG. 10 is a perspective view of a suction storage tank used in the device for preparing hologram particles of the present invention; and FIG. 11 is a sectional view of a discharger used in the device for preparing hologram particles of the present invention.

DETAILED DESCRIPTIONS OF THE REFERENCE NUMERALS

1: Base material film
2: Protection layer
3: Hologram thin film layer
4: Heat adhesive layer
100: Main body
200: Classifier
300: Suction storage tank
400: Discharger
500: Vacuum pump
101: Hologram transfer film take-up roll
102: Hologram transfer film
103: Guide roll
104: Hologram particle
105: Roll brush
106: base material film
107: Base material film take-up roll
108: Motor
109: Hologram particle container
110: Cover
111: Hologram particle discharge port
112: Air suction port
113: Power supplier
114: Switch
201: Hologram particle suction port
202: Motor
203: Shaft
204: Diaphragm
205: Brush
206: Hologram particle discharge port
207: Hologram particle discharge port
301: Hologram particle suction port
302: Air exhaust port
303: Filter
304: Hologram particle discharge port
305: Covering part
401: Hologram particle suction port
402: Filter
403: Discharge tube
404: Valve
405: Air exhaust port

MODE FOR THE INVENTION

Hereinafter, the embodiments of the present invention will be described in detail with reference to accompanying drawings.

A variety of methods of painting on a base material surface using a transfer film for according to the present invention will be described below.

First, a method of partially painting such that a step is not generated using a hologram transfer film according to the present invention will be described. The method comprising the steps of:

A) performing transparent painting on a base material surface and preliminarily drying it;

B) heating at 40 to 70° C. or spraying an organic solvent before a transfer film is attached after the preliminary dry;

C) attaching a heat adhesive layer of a hologram transfer film having a base material film, a protection layer, a hologram thin film layer and the heat adhesive layer sequentially laminated from a bottom thereof;

D) heat-treating the attached transfer film and the transparent painting surface together at 50 to 200° C.; and E) cooling the transfer film and the transparent painting surface and then removing the base material film of the transfer film.

In the present invention, the step of A) preliminarily drying means drying to a degree where a painting surface of the transparent painting is not sticky. Generally, it is preferred that the drying be performed for 30 minutes or more in a case of quick-drying painting or for 2 hours or more in a case of slow-drying painting. Since the drying is performed to a degree where the painting surface of the transparent painting is not sticky but complete curing is not performed in the step of preliminary drying, the transfer film with a thin thickness is well attached without an adhesive agent and even on an irregular place.

Further, since the transfer film is not well attached in a case where much time has elapsed in the step of preliminarily drying after performing the transparent painting, it is desirable to make a state where the transfer film is easily attached on the base material film by adding a step of heating the painting surface at 40 to 70° C. or spraying an organic solvent as the step B). In a case where the base material film is a metallic surface in a state where the base material surface is cured when much time has elapsed after performing the transparent painting, heat may be applied after attaching the transfer film and then attaching a rubber magnet or rubber plate thereon. However, in a case where the base material film is not a metallic surface, the transfer film is preferably attached such that the transparent painting surface has a little viscosity by heating or spraying an organic solvent as described above.

At this time, the used organic solvent may use any one or more organic solvents selected from alcohols such as ethanol, methanol and isopropanol; esters such as ethyl acetate and butyl acetate; ethers such as ethylcellosolve and butylcellosolve; ketones such as acetone, methyl ethyl ketone and methylisobutylketone; and aromatic hydrocarbons such as toluene and xylene. Further, the used organic solvent may use thinner that is a diluent used generally.

In a case where the base material film is attached on the transparent painting surface and then heat-treated in the present invention described above, since the heat adhesive layer, the hologram thin film layer and the protection film are impregnated into the transparent painting surface while the transparent painting is being cured, the base material film is easily removed without applying a force in a case where the base material film formed on a top of the attached surface is removed after cooling.

Preferably, the transparent painting uses a thermosetting resin cured by means of heat in the present invention. Although the transparent painting may use any one or more selected from aminoalkyd resin, thermosetting acryl resin, melamine resin and fluoric resin, it is not limited thereto.

Since the thermosetting acryl resin has a structure in which various kinds of active functional groups forms a pendant group at a frame of acryl and a copolymerization chain such as methacrylic acid ester, styrene, vinyl toluene pendant group, the pendant group reacts to acryl resin or other resin for painting under heat or a catalyst so that a three-dimensional reticular structure with infinite molecular amount is formed.

Further, in a case where the base material surface is the appearance of an automobile, the transparent painting means a clear painting in the present invention, and a paint used in the clear painting of an automobile generally uses an aminoalkyd group or a thermosetting acryl group. Besides, any paint generally used in a correspondent field is not limited thereto.

Furthermore, a pigment may be further added to the transparent painting so as to implement a color. At this time, the used pigment may use any one or more selected from a extender such as talc and calcium carbonate; a rust resisting pigment such as zinc chromate, zinc powder and barium sulfate; an inorganic pigment such as titanium oxide, iron oxide and rock; an organic pigment such as phthalocyanine blue, quinacridone red; and other color pigments.

In the present invention is provided a method of attaching a rubber magnet plate or rubber plate to receive a portion or entire surface of the transfer film and then indirectly heating it when heat-treating at the step D). In a case where the rubber magnetic or rubber plate is attached and the heated as described above, since heat is equally transmitted, there is an advantage in that a printing surface is equally attached when the base material film is removed after transferring. Although there may occur a phenomenon in that the base material film is melted in a case where a temperature is too much high when directly heating, since such a phenomenon is prevented in a case where the rubber magnet or rubber plate is attached and then heated, it is preferable to apply heat safely and uniformly.

Preferably, the heating is performed at 50 to 200° C. This refers to a temperature at which the transparent painting surface is cured and the printing surface of the transfer film is transferred. The temperature may be selectively used depending on a composition.

Further, it is possible to additionally perform transparent painting after the step E). Preferably, a transfer is achieved by removing the base material film and then finishing as described above. More preferably, a cleaner finish can be achieved by transferring and then performing transparent painting to finish.

FIG. 1 shows a configuration of a hologram transfer film used in the present invention, and this will be described in detail below.

As shown in FIG. 1, the hologram transfer film according to the present invention has a base material film 1, a protection film 2, a hologram thin film layer 3 and a heat adhesive layer 4 sequentially laminated from a bottom thereof.

Preferably, the base material film 1 uses a transparent resin film. For example, the base material film may use a polyester film, a polyvinylchloride film, a polyethylene film, a polypropylene film or the like, and the polypropylene film is preferably used.

The protection layer 2 functions as a release agent that allows the printing layer 3 to be easily separated from the base material film 1. Since the protection layer is positioned outside the printing layer to protect a surface thereof and prevent scratching in a case where it is transferred, and it functions to allow hologram particles to be maintained in a case where it is scratched to use as a painting composition, it may be selectively used as necessary in the present invention. For example, the protection layer preferably uses any one or more resins selected from an aminoalkyd group, a thermosetting acryl group, polyurethane, polyester, polypropylene, paraffin wax, ethylene vinyl acetate and epoxy. Since the thermosetting acryl-based resin has a structure in which various kinds of active functional groups forms a pendant group at a frame of acryl and a copolymerization chain such as methacrylic acid ester, styrene, vinyl toluene pendant group, the pendant group reacts to acryl resin or other resin for painting under heat or a catalyst so that a three-dimensional reticular structure with infinite molecular amount is formed.

The hologram thin film layer 3 is one in which any one or more metal powder, any one or more glossy particles and any one transparent resin are mixed to apply on a top of the protection layer, and a hologram pattern is then formed through a gravure or rotary screen printing method, the any one or more metal power being selected from aluminum, zinc, nickel, chrome, titanium, zinc oxide, zirconium oxide, iron oxide, tin oxide, aluminum oxide, magnesium oxide, barium titanic acid, zinc titanic acid and barium sulfate; the any one or more glossy particles being selected from a rainbow, fabric powder, a pearl sheet chip, a fluorescent pigment chip, a reflection sheet chip and shell powder; and the any one transparent resin being selected from polyester, polyamide, polyvinylchloride, styrene-based copolymerization resin and ionomer resin that is a copolymer of methacrylic acid or acrylic acid, and ethylene. Further, the hologram thin film layer may additionally use a bonding agent.

The bonding agent functions to allow metal powder to be attached on a base material. For example, the bonding agent may use V2000 by Visprox, TC18700 series, TCP9900 series or the like.

Such has an effect in that it shows a different color depending on a three-dimensional pattern and an angle. At this time, since a metal film can be processed to have a hologram pattern through a general method except the aforementioned gravure or rotary screen printing method, the printing layer is not limited thereto.

The compositions used for the hologram thin film layer 3 in the present invention use a composition ratio at a level generally used by those skilled in the art and may be modified by a user as necessary.

The polyester of the transparent resins used to form the hologram thin film layer may be aliphatic polyester such as polycaprolactone or polylactide; amorphous polyester such as polyethyleneterephthalate glycol; aromatic polyester such as polyethyleneterephthalate, polybutylene naphthalate or polyethylene naphthalate; and the like.

As the polyamide may be used crystalline aliphatic polyamide such as polyamide 6, polyamide 6/6, polyamide 11, polyamide 12 or polyamide 6/10; amorphous polyamide such as a copolymer of terephthalic acid or isophthalic acid, and hexamethylenediamine; aromatic polyamide such as polymethaxylene adipamide; or the like.

The styrene-based resin may use any one or more selected from acrylonitrile-butadiene-styrene (ABS), styrene acrylonitrile (SAN) and methylmethacrylate-butadien-styrene (MBS) copolymerization resins.

Preferably, the ionomer resin that is a copolymer of methacrylic acid or acrylic acid, and ethylene is a resin in which an acid content is 3 to 20 wt % and 20 to 80 wt % of the total acid is neutralized with lithium ions ($Li^+$), natrium ions ($Na^+$), zinc ions ($Zn^+$), magnesium ions ($Mg^+$) or the like. Preferably, its melt index is 0.5 to 10 g/10 min. As its example may be Surlyn 8920 by DuPont in U.S., which is an ionomer resin provided with a copolymer structure of methacrylic acid neutralized with natrium ions and ethylene, Iotek 3110 by ExxonMobil in U.S, which is an ionomer resin provided with a copolymer structure of acrylic acid neutralized with natrium ions and ethylene. and the like. Particularly, since the hologram thin film has a characteristic of superior strength and impact resistance in a case where it is formed using the ionomer resin, a hologram pattern can be maintained even in a case where it is scratched.

In the present invention, the hologram thin film layer 3 is preferably formed as a thin foil with a thickness of 0.1 to 150☐ because it does not generate a step but is impregnated into the transparent painting surface.

The heat adhesive layer 4 corresponds to an adhesive surface and preferably has an adhesive property in a case where heat is applied contrary to a general adhesive layer with adhesion at a normal temperature. Although, it is desirable to use any resin that generally allows a base material surface transferred from a transfer film to be adhered by applying heat, it is possible to use a hot-melt resin. More preferably, the heat adhesive layer uses any one or more resins selected from polyurethane, polyester, epoxy, acryl and acryl-urethane.

Since the printing layer 3 in which a hologram thin film layer is formed as described above is interposed between the heat adhesive layer 4 and the protection layer 2 in the present invention, a hologram pattern with a thin and broad pattern is maintained as it is by means of the aforementioned layers even in a case where it is scratched.

Further, the transfer film used in the present invention has a thin thickness and no adhesive property at a normal temperature contrary to a general adhesive layer. However, in a case where heat is applied to the transfer film, the transparent painting is cured and perfectly transferred and impregnated into a surface of the transparent painting together with the printing layer at the same time. Thus, there can be provided a novel painting method in which there is a characteristic in that a printing surface is not peeled off by means of an application of a physical force and erased by means of a solvent or the like in a case where partial painting is performed using the transfer film of the present invention.

Another aspect of a painting method according to the present invention will be described below.

In another painting method of the present invention to be described below, a painting composition is prepared by separating hologram particles from a hologram transfer film and then mixing the hologram particles and a binder solution so as to use for painting.

A method of painting on a base material film using a painting composition will be described. The method comprises the steps of:

1) performing transparent painting on a base material surface and drying;

2) coating a painting composition, in which hologram particles scratched from a hologram transfer film to classify by each size of the particles and a binder solution are mixed, on the base material surface; and 3) drying the composition and then performing transparent painting.

A hologram is formed on the base material surface through the method, and transparent painting is performed once more such that a coating film has durability.

At this time, the coating method may selectively and variously use a spray for painting, a brush or the like depending on a size of the hologram particle.

In a case where a long period of time elapses after having mixed the scratched hologram particles and the binder solution at the step 2) of the present invention, since there exists a case where a heat adhesive layer and a protection layer are dissolved in the binder solution so that a hologram pattern is disappeared, they are mixed preferably just before use or one day to a week, more particularly before 1 to 24 hours for use. That is, it is the most preferable to use a painting method of mixing the particles scratched by means of a physical force and the binder solution before 1 to 24 hours to coat on the base material surface.

A method of preparing a painting composition for forming a pattern with thin and various sizes while the tabular shape of hologram particles are maintained on a base material surface will be suggested below.

The method of preparing a painting composition comprises the steps of:

a) scratching a hologram transfer film having a base material, a protection layer, a hologram thin film layer and a heat adhesive layer sequentially laminated from a bottom thereof such that the tabular shape of a hologram particles is maintained by applying a physical force to the rest of the layers except the base material film; and b) mixing the hologram particles of which tabular shape is maintained by the heat adhesive layer and the protection layer and a binder solution, wherein the shape of the hologram particles are maintained.

Further, the particles scratched at the step a) are more preferably used by classifying them for each size in the present invention. At this time, the classification may be performed using a filter net depending on an average particle size and used by separating for each weight of the particle through wind. Further, a hologram particles painting composition may be prepared by separating for each particle size through a device to be described later in the present invention.

Furthermore, the present invention may selectively use an additional dispersant at the step b). As the dispersant may be used a polycarboxylic acid-based anion surfactant; any one or more nonionic suffactants selected from ethylene oxide compound, polyoxyethylene glycol, sorbitan fatty acid ester, polyoxyethylenealkylether and poly-oxyethylenealky phenylether; or any one or more selected from monophosphate ester, polyphosphate ester, acrylate copolymer, modified silicone group and sodium hexametaphosphophate.

The dispersant is used to secure the water resistance, abrasion resistance, attaching property and chemical resistance of a coating film, the storage safety of a painting composition and the dispersion safety of hologram particles. Further, the dispersant is selectively used as necessary.

In the present invention, the binder solution preferably uses one in which any one or more resins selected from polyurethane, polyester, epoxy, acryl and acryl-urethane are dispersed in an organic solvent. However, the binder solution is not limited to the resins but may be used by mixing a paint generally used. More preferably, the binder solution uses a resin identical with or similar to the heat adhesive layer and the protection layer so that a hologram pattern is not broken or smashed but well dispersed. Further, the binder solution may use a watersoluble and solvent-type paint for painting except those described above.

Further, an additional oily/dry or organic solvent may be selectively used at the step b).

The oily/dry solvent is used to adjust a drying speed of a coating film when painting and preferably uses ethyl-cellulose. Preferably, the oily/dry solvent is used by adjusting its content to be suitable for a temperature in accordance with a season. Further, it is preferable to use a larger amount of the oily/dry solvent in a winter season than in summer season. The organic solvent preferably uses any one or more selected from ethanol, methanol, isopropyl alcohol, methyl ethyl ketone, acetone and toluene, but is not limited thereto.

In the present invention, the hologram transfer film may use one widely sold at a market. More preferably, the hologram transfer film uses one prepared according to a preparing method of the present invention such that the tabular shape of hologram particles is maintained and a mixture with a binder solution is facilitated.

The reason why the present inventor has select a transfer film having a hologram transferred thereon or a film is that there is a disadvantage in that it is possible to form a hologram pattern using hologram tubular shape particles generally sold at a market, but the size of the particle is limited so that the thickness of a surface becomes thick and a smooth surface cannot be obtained in a case where the hologram tabular shape particles are used.

Thus, the present inventor has intended to use a transfer film having a hologram formed thereon and a transfer film provided with a configuration of a heat adhesive layer, a hologram thin film layer, a protection layer and a base material film. Further, the hologram thin film formed on the transfer film through a printing method of gravure or the like has an advantage in that since the thickness of coating does not become thick due to its thin thickness and a hologram pattern with a peculiar shape can be provided.

Since the hologram transfer film used for preparing a painting composition in the present invention uses a hologram transfer film identical with that described in the aforementioned partial painting method, more descriptions will be omitted.

Further, a method of scratching the hologram particles in the present invention may be used by applying a physical force using a broad tabular shape tool, but can consecutively perform scratching in a case where a roll scratching method is used. In a case where the hologram particles are scratched from the hologram transfer film using a device to be described later (shown in FIGS. 2 to 11), it can be seen that the heat adhesive layer and the protection layer including the hologram thin film layer are simultaneously separated from the base material film. In a case where this is used to mix with a binder solution, it can be found that a hologram pattern can be easily formed.

A device for preparing hologram particles using a hologram transfer film in the present invention will be described below. The device for preparing hologram particles is shown in FIGS. 2 to 11.

This will be described in detail below in reference with these figures.

FIG. 2 shows a schematic view of a device for preparing hologram particles of the present invention. The device of the present invention comprises:

a main body 100 having a roll brush for scratching a hologram transfer film to prepare hologram particles and a container;

a classifier 200 connected to one side of the container to classify hologram particles for each size or to shatter them with a certain size;

a suction storage tank 300 connected to the classifier to store hologram particles classified for each size;

a discharger 400 connected to the suction storage tank to easily adjust discharge of the hologram particles; and a vacuum pump 500 connected to a suction or discharge port of each of the main body 100, the classifier 200, the suction storage tank 300 and the discharger 400 so as to move hologram particles by applying an air pressure.

A device used in the roll scratching method in the present invention will be disclosed below. This is shown in FIGS. 3 to 5. FIG. 3 is a perspective view showing an exemplary embodiment of a main body 100 used in the device for preparing hologram particles of the present invention. FIG. 4 is a perspective view an operation of the main body 100. FIG. 5 is a sectional view of the main body 100.

First, the body 100 of the present invention will be described with reference to FIG. 5. The main body 100 comprises:

a hologram transfer film take-up roll 101 having a hologram transfer film 102 on which a hologram is laminated on a base material film 106 winded thereon;

a roll brush 105 for scratching remaining portions except the base material film 106 on the hologram transfer film 102 supplied from the hologram transfer film take-up roll 101;

a guide roll 103 for guiding to the roll brush such that the hologram transfer film 102 is scratched while being tensed;

a hologram particle container 109 for receiving particles scratched to drop by the roll brush 105;

a base material film take-up roll 107 having the base material film 106 remaining after having been scratched by the roll brush 105 rewound thereon; and a motor 108 for driving the roll brush 105 and the base material take-up roll 107.

The present invention uses the device so that hologram particles can be effectively scratched, and the scratched hologram particles are collected into the hologram particle container 109 of a drawer type.

In a roll scratching method using the device, the hologram transfer film 102 taken u p on the hologram transfer film take-up roll 101 is released to tense while passing through the guide roll 103, and a protection layer, a hologram thin film layer and a heat adhesive layer are scratched from the base material film 106 while passing through the roll brush 105 formed in a direction of the guide roll 103 to be off as far as the thickness of the base material film. The scratched protection layer, hologram thin film layer and heat adhesive layer become hologram particles 104 to drop downward, and only the base material film 106 is moved along with the guide roll 103 to wind on the base material film take-up roll 107. In a case where the roll scratching method is used, the hologram particles can be prepared by consecutively scratching.

The scratched hologram particles 104 are classified for each size using a filter net or by means of wind to selectively use a particle size suitable to form a pattern required by a user so that painting can be easily performed. Further, the scratched particles may be crushed to prepare and use them as finer ultra-fine powder.

Another device of the present invention, in which particles can be classified for each size through a filter net, will be disclosed below. This is shown in FIGS. 6 to 8. FIG. 6 is a perspective view showing another exemplary embodiment of the main body 100, FIG. 7 is a perspective view showing an opposite side thereof, and FIG. 8 shows a sectional view thereof.

The main body 100 that is a further aspect of the present invention comprises:

a hologram transfer film take-up roll 101 having a hologram transfer film 102 on which a hologram is laminated on a base material film winded thereon;

one or more roll brushes 105 for scratching remaining portions except the base material film 106 on the hologram transfer film 102 supplied from the hologram transfer film take-up roll 101;

one or more guide rolls 103 for guiding to the roll brush such that the hologram transfer film 102 is scratched while being tensed;

a hologram particle container 109 for receiving hologram particles 104 scratched to drop by the roll brush 105;

a base material film take-up roll 107 having the base material film 106 remaining after having been scratched by the roll brush 105 rewound thereon; and a motor 108 for driving the roll brush 105 and the base material take-up roll 107.

In the present invention, the guide roll 103 has a brush shape provided with a brush to effectively scratch by means of friction as shown in these figures.

Further, it is preferred that the main body 100 further comprise a cover 110 for preventing upper hologram particles from being left in the air.

Furthermore, a hologram particle discharge port 111 connected to the classifier 200 by means of the vacuum pump 500 is provided to the container 109 of the main body 100; and an air suction port 112 allowing air exhausted from the vacuum pump 500 to be flowed therethrough is provided to a portion provided with the roll brush 105, which is an upper portion of the container, so as to smooth a flow of the hologram particles.

In addition, the main body may comprise a power supplier 113 and a switch 114.

More specifically, referring to FIG. 8, a plurality of roll brushes 105 are preferably provided to perfectly scratch such that there is no residue on the base material film. Further, the guide roll 103 with a shape identical with the roll brush is preferably provided to engage with the roll brush 105 and the hologram transfer film 102. Since the hologram transfer film used in the present invention has a film shape with a thin thickness, the guide roll 103 with a brush shape increase an engaging area so that scratching can be effectively performed. The hologram particles 104 scratched by the roll brush 105 and the guide roll 103 drops into the container 109. At this time, the hologram particles are not laminated but smoothly flowed by means of wind flowed from the air suction port 112 through which air exhausted from the vacuum pump 500 is flowed, and smoothly discharged through the hologram discharge port 111 provided at a lower portion of the container. Further, the scratched base material film 106 is rewound on the base material film take-up roll 107.

In the device of the present invention, the classifier 200, the suction storage tank 300 and the discharger 400 are provided as a configuration used to classify hologram particles for each size.

In the present invention, as shown in FIG. 9, the classifier 200 comprises a hologram particle suction port 201 connected to the hologram particle discharge port 111 through a hose; a shaft 203 is positioned at a center to connect with a motor 202; one or more diaphragms 204 formed as a mesh net that becomes dense as reaching a lower stage to classify hologram particles for each size; one or more brushes 205 fixed to the shaft 203 to rotate by means of the motor 202 while being contacted with the mesh net; and a hologram particle discharge port 206. Hologram particles are crushed through the brush 305 rotated by means of the motor 202 so that fine particles are prepared as reaching a lower stage.

The mesh net used in the diaphragm 204 should use one that becomes dense as reaching a lower stage such that fine particles can be prepared as reaching a lower stage. Here, the brushes 205 are provided to rub against the mesh net so that hologram particles can be smoothly discharged to a lower stage and the hologram particles can be finely crushed at the same time.

At this time, since there is no friction between the brush 205 and the diaphragm 204 that is a mesh net in a case where the motor 202 is not driven, hologram particles are flowed to a lower portion by means of a vacuum of the vacuum pump 500 for each size in a state where they are not crushed but crushed by the roll brush provided in the main body 100. Further, large particles remains at an upper portion by means of the mesh net as they are so that they can be classified for each size. In this case, the particles can be classified into a coarse particle, a fine particle, a minute particle and the like to appropriately select and use as necessary.

At this time, a discharge port 207 is preferably formed on a side surface of the classifier 200 for each stage formed with each of the diaphragms 204 such that hologram particles are separately discharged for each size.

In the present invention, as shown in FIG. 10, the suction storage tank 300 comprises a hologram particle suction port 301 connected to the hologram particle discharge port 206 of the classifier 200; an air exhaust port 302 connected to the vacuum pump; a filter 303 with a pack shape connected to the air exhaust port 302 to suck air and not to suck fine particles; a hologram particle discharge port 304 through which hologram particles collected to the outside of the filter 303 are discharged; and a cover part 305 for facilitating cleaning.

At this time, after the hologram particle discharge port 304 of the suction storage tank 300 has been closed to operate the device, the hologram particle discharge port 304 is again opened to operate the device if hologram particles are collected so that it is possible to move the hologram particles to the discharger 400.

In the present invention, as shown in FIG. 11, the discharger 400 comprises a hologram particle suction port 401 connected to the hologram particle discharge port 304 of the suction storage tank 300; a filter 402 with a pack shape connected to the suction port 401; a discharge tube 403 formed to the outside while passing through a bottom of the discharger 400 from a bottom of the filter 402; a valve 404 provided at a lower portion of the discharge port 403 to induce the discharge of hologram particles; and a discharge port 405 connected to the vacuum pump 500. At this time, hologram particles are collected inside the filter 402 of the discharger 400, discharged to the lower portion through the discharge port 403 so that discharge can be adjusted through the valve 404. The hologram particles can be discharged into a packaging container with any shape while being adjusted as an appropriate amount using the discharger 400 provided with such a structure so that they can be easily commercialized.

In the present invention, the filter with a pack shape used in the suction storage tank 300 and the discharger 400 is a filter formed with a fine film through which an inflow of air is possible but that of fine particles are impossible. Generally, filters used in a vacuum cleaner filter or the like are possible.

INDUSTRIAL APPLICABILITY

In a case where a partial painting method according to the present invention is used, since a printing layer is completely transferred onto and impregnated into a base material surface subjected to partial painting, it is possible to perform a novel partial painting with a characteristic in that there occurs no step, it is possible to easily attach even on an irregular surface and the printing pattern is not erased due to the complete attachment although a solvent is used.

Further, there is an advantage in that a transfer film according to the present invention is completely transferred onto a transparent painting surface and can impart a three-dimensional effect to a hologram or the like.

Furthermore, in a case where a painting composition according to the present invention, there can be provided painting forming a three-dimensional pattern of a hologram through a method simpler and easier than a transferring method.

In addition, the present invention can provide a method of preparing a painting composition with which a hologram pattern with thin and various sizes and shapes can easily painted, and a painting method using the painting composition.

Moreover, in a case where painting is performed through a painting method according to the present invention, there is an advantage in that it can impart a hologram effect that a color is changed depending on a viewing angle when a painting surface faces light, and have a superior durability and an elegant surface.

Further, in a case where a device for preparing hologram particles according to the present invention is used, the hologram particles can be consecutively and simply prepared.

The invention claimed is:

1. A device for preparing hologram particles, comprising:
a main body having a roil brush for scratching a hologram transfer film to prepare hologram particles and a container, a classifier connected to one side of the container to classify hologram particles for each size or to shatter them with a certain size;
a suction storage tank connected to the classifier to store hologram particles classified for each size;
a discharger connected to the suction storage tank to easily adjust discharge of the hologram particles; and
a vacuum pump connected to a suction or discharge port of each of the main body, the classifier, the suction storage tank and the discharger so as to move hologram particles by applying an air pressure;
wherein the main body comprises:
a hologram transfer film take-up roll having a hologram transfer film on which a hologram is laminated on a base material film winded thereon;
a roll brush for scratching remaining portions except the base material film on the hologram transfer film supplied from the hologram transfer film take-up roil;
a guide roll for guiding to the roll brush such that the hologram transfer film is scratched while being tensed;
a hologram particle container for receiving particles scratched by the roll brush and caused to drop into said container;
a base material film take-up roll having the base material film remaining after having been scratched by the roll brush rewound thereon; and
a motor for driving the roll brush and the base material take-up roll.

2. The device as claimed in claim 1, wherein the guide roll is provided with a brush.

3. The device as claimed in claim 1, wherein the main body includes a cover for preventing upper hologram particles from being left in the air.

4. The device as claimed in claim 1, wherein:
a hologram particle discharge port connected to the classifier by means of the vacuum pump is provided to the container of the main body; and
an air suction port allowing air exhausted from the vacuum pump to be flowed therethrough is provided to a portion provided with the roll brush, which is an upper portion of the container, so as to smooth a flow of the hologram particles.

5. A device for preparing hologram particles, comprising:
a main body having a roil brush for scratching a hologram transfer film a main body having a roll brush for scratching a hologram transfer film to prepare hologram particles and a container, a classifier connected to one side of the container to classify hologram particles for each size or to shatter them with a certain size;
a suction storage tank connected to the classifier to store hologram particles classified for each size;
a discharger connected to the suction storage tank to easily adjust discharge of the hologram particles; and
a vacuum pump connected to a suction or discharge port of each of the main body, the classifier, the suction storage tank and the discharger so as to move hologram particles by applying an air pressure;
wherein the classifier comprises:
a hologram particle suction port connected to the hologram particle discharge port;
a shaft is positioned at a center to connect with a motor;
one or more diaphragms formed as a mesh net that becomes dense as reaching a lower stage to classify hologram particles for each size;
one or more brushes fixed to the shaft to rotate by the motor while being contacted with the mesh net; and
a hologram particle discharge port, so that hologram particles crushed by the brush rotated by means of the motor such that fine particles are prepared as reaching a lower stage.

6. The device as claimed in claim 5, wherein a discharge port is preferably formed on a side surface of the classifier for each stage formed with each of the diaphragms such that hologram particles are separately discharged for each size.

7. A device for preparing hologram particles, comprising:
a main body having a roll brush for scratching a hologram transfer film to prepare hologram particles and a container, a classifier connected to one side of the container to classify hologram particles for each size or to shatter them with a certain size;
a suction storage tank connected to the classifier to store hologram particles classified for each size;
a discharger connected to the suction storage tank to easily adjust discharge of the hologram particles; and
a vacuum pump connected to a suction or discharge port of each of the main body, the classifier, the suction storage tank and the discharger so as to move hologram particles by applying an air pressure;

wherein the suction storage tank comprises;
- a hologram particle suction port connected to the hologram particle discharge port of the classifier;
- an air exhaust port connected to the vacuum pump;
- a filter with a pack shape connected to the air exhaust port to suck air and not to suck fine particles;
- a hologram particle discharge port through which hologram particles collected to the outside of the filter are discharged; and
- a cover part for facilitating cleaning.

8. A device for preparing hologram particles, comprising:
- a main body having a roil brush for scratching a hologram transfer film to prepare hologram particles and a container, a classifier connected to one side of the container to classify hologram particles for each size or to shatter them with a certain size;
- a suction storage tank connected to the classifier to store hologram particles classified for each size;
- a discharger connected to the suction storage tank to easily adjust discharge of the hologram particles; and
- a vacuum pump connected to a suction or discharge port of each of the main body, the classifier, the suction storage tank and the discharger so as to move hologram particles by applying an air pressure;

wherein the discharger comprises;
- a hologram particle suction port connected to the hologram particle discharge port of the suction storage tank;
- a filter with a pack shape connected to the suction port;
- a discharge tube formed to the outside while passing through a bottom of the discharger from a bottom of the filter;
- a valve provided at a lower portion of the discharge port to induce the discharge of hologram particles; and
- a discharge port connected to the vacuum pump.

* * * * *